Jan. 31, 1950 C. J. WAGNER 2,495,830
VENTILATOR CONSTRUCTION
Filed Feb. 25, 1946 2 Sheets-Sheet 1
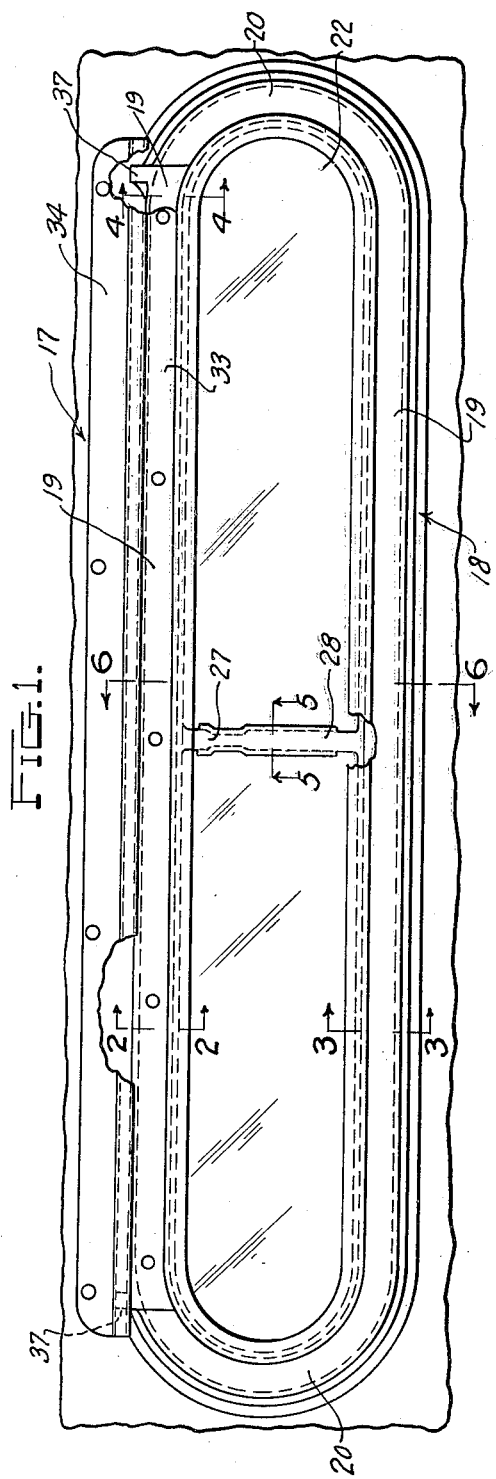
INVENTOR.
CARL J. WAGNER
BY
Whittemore Hulbert & Belknap
ATTORNEYS

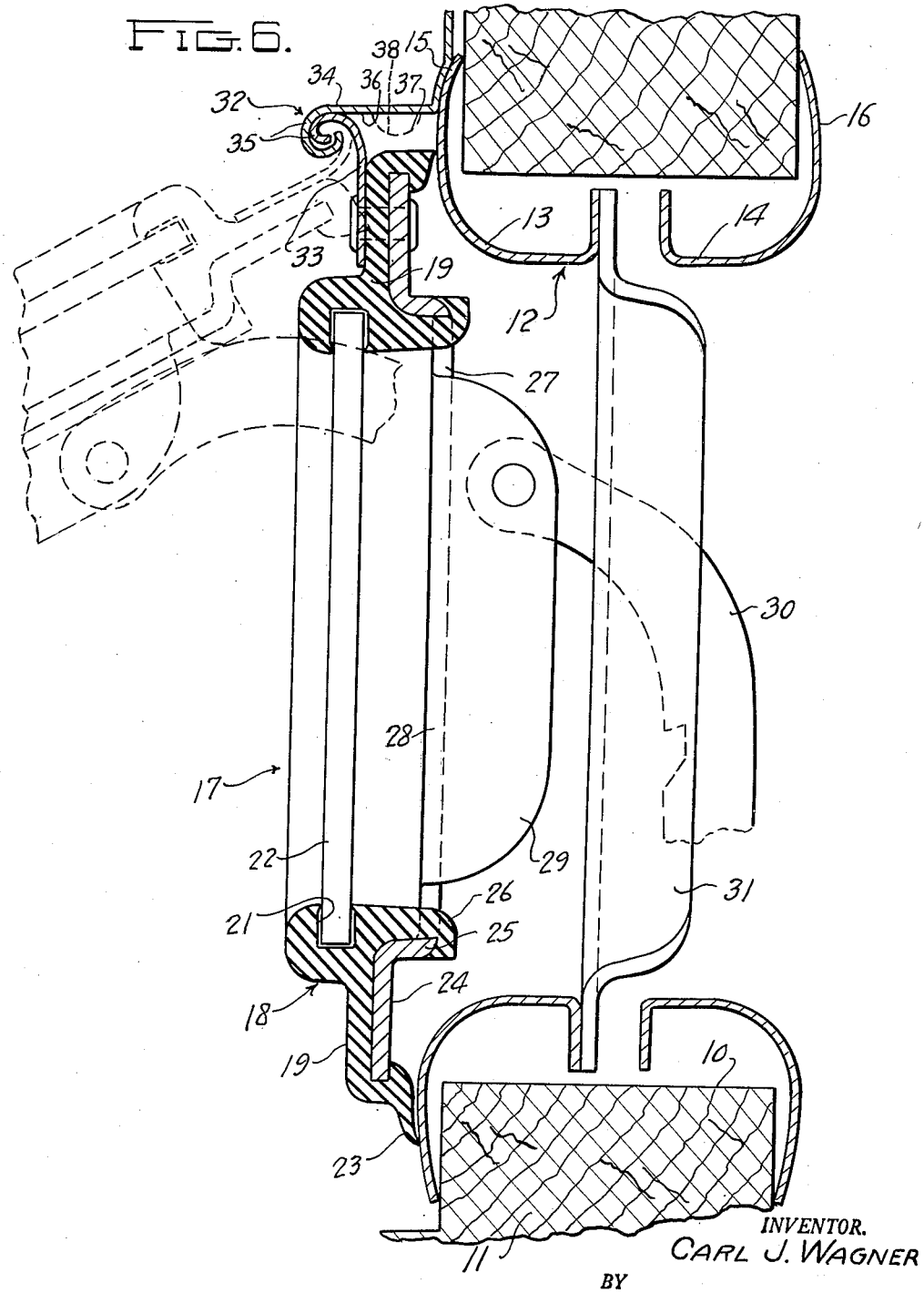

Patented Jan. 31, 1950

2,495,830

UNITED STATES PATENT OFFICE 2,495,830

VENTILATOR CONSTRUCTION

Carl J. Wagner, Detroit, Mich.

Application February 25, 1946, Serial No. 649,887

4 Claims. (Cl. 189—69)

This invention relates generally to window constructions and refers more particularly to improvements in swinging windows or ventilators.

One of the objects of this invention is to provide a ventilator capable of being readily installed in the roof or side walls of practically any enclosure requiring ventilation and is especially applicable to vehicle bodies such, for example, as trailers, buses or the like.

Another object of this invention is to provide a window type ventilator hinged along one edge to the window frame and having means coacting with the window frame to form a weather-tight seal around the ventilator when swung to its closed position.

A further object of this invention is to provide a ventilator having a one-piece frame formed of a moldable resilient material, such for example, as rubber, synthetic rubber or materials having similar characteristics and reinforced with a one-piece metal frame preferably stamped from sheet metal.

Still another feature of this invention is to provide a ventilator of the above type wherein the rubber or rubber-like frame is molded or bonded to the metal frame to form an integral unit and wherein the rubber or rubber-like frame is formed with a continuous glass channel.

A still further object of this invention is to provide a rubber or rubber-like frame having a resilient lip extending continuously around the perimeter of the ventilator in a manner to engage the adjacent side of the window frame in the closed position of the ventilator to effect a weather-tight seal around the ventilator.

Another object of this invention is to provide a rubber or rubber-like frame having projections extending laterally outwardly from the hinged side of the frame adjacent opposite ends of the latter side and adapted to seal the openings at opposite ends of the hinge when the ventilator frame is in its closed position.

The foregoing as well as other objects will be made more apparent as this description proceeds, especially when considered in connection with the accompanying drawings, wherein:

Figure 1 is a plan view of a ventilator embodying the features of this invention; and Figures 2 to 6 inclusive are cross sectional views, respectively taken on the lines 2—2, 3—3, 4—4, 5—5 and 6—6 of Figure 1.

For the purpose of illustrating the present invention, the ventilator is shown in Figure 6 of the drawings as installed at the outer side of a window opening 10 formed in a wall 11 of an enclosure and supported on a fixed frame 12 for the window opening. The frame 12 comprises sheet metal garnish molding frames 13 and 14. The outer garnish molding 13 projects into the opening 10 from the outer side of the latter and is formed with a continuous flange 15 positioned at the outboard side of the wall 11. The garnish molding 14 extends into the opening 10 from the inner side of the latter and is formed with a continuous flange 16 positioned at the inboard side of the wall 11. The garnish moldings are secured to the wall 11 in accordance with conventional practice by screws or equivalent fastening means not shown herein.

In the present instance the opening 10 and fixed frame are rectangular in shape, although it will be understood as this description proceeds that the invention is not limited to openings of any specific shape. Regardless of the shape of the opening 10, the latter is closed by a ventilator indicated generally in the several figures of the drawings by the reference character 17 and having a frame 18 corresponding substantially in shape to the shape of the fixed frame 12. Thus, the frame 18 is rectangular in shape having laterally spaced side portions 19 connected together at opposite ends by arcuate end portions 20.

The frame 18 is formed of a resilient moldable material, such for example, as rubber or any one of the various synthetic rubbers, and is molded in one piece with a continuous channel 21 at the inner side for receiving the marginal edges of a closure 22, preferably in the form of glass or some similar transparent material. In addition, the frame 18 is formed with a resilient lip 23 extending continuously around the perimeter of the frame in a manner to engage the outer wall 15 of the fixed frame 12 and form a weather-tight seal around the opening 10.

The frame 18 is reinforced by a metal frame 24 corresponding in shape to the frame 18 and preferably bonded to the inner side of the frame 18, as the latter is molded, to form an integral structure. In the interest of economy in manufacture, the frame 24 is stamped from sheet metal and the outer marginal edges are interlocked in the rubber-like frame 18 adjacent the lip 23 in the manner clearly shown in Figures 2 to 6 inclusive of the drawings. The inner edge portions of the bars of the reinforcing frame 24 are fashioned to form an inwardly extending continuous flange 25 embedded in a corresponding flange 26 on the rubber-like frame 18 and providing a backing for the latter flange 26. The opposite side bars of the frame 24 are connected intermediate the ends of the frame by a cross member 27 having a portion 28 channel shaped in cross section to provide attaching flanges 29 for pivotally supporting one end of a latch arm 30. The latch arm 30 cooperates with a division bar 31 of the frame 12 to hold the ventilator in different open positions.

One side 19 of the ventilator frame 18 is pivotally connected to the garnish molding 13 of the fixed frame 12 by a hinge 32 comprising hinge parts 33 and 34, preferably formed of sheet metal. The hinge part 33 is secured to the outer surface of the top side 19 of the frame 18 and extends for substantially the full length of the latter side 19. The hinge part 34 is fixed to the portion 15 of the frame 12 and extends outwardly in lateral spaced relation to the top side 19 of the frame 18. The hinge part 34 has a length slightly longer than the length of the hinge part 33 and the free edge portions of the two hinge parts are rolled or otherwise formed to provide loops 35. The loop 35 on the free edge of the hinge part 33 is smaller than the loop 35 on the cooperating hinge part 34 and has a rolling fit in the latter loop to provide a hinge connection between the parts. As a result, the ventilator may be swung between the full and broken line positions shown in Figure 6 of the drawings.

When the ventilator 17 is in its closed position shown by the full lines in Figure 6 of the drawings, the lip 23 extending around the perimeter of the frame 18 bears against the wall portion 15 of the fixed frame and provides a weatherproof seal. However, in some installations, it is desirable to also seal the openings 36 at opposite ends of the hinge 32 and thereby prevent moisture, rain or snow from entering the space enclosed by the hinge parts. This is accomplished herein by forming pads or projections 37 on opposite ends of the top side 19 of the frame 18. The pads 37 project upwardly from the top side 19 of the rubber-like frame 18 and are formed integral with the latter. The size and shape of the pads 37 corresponds generally to the cross sectional area of the openings 36 and, if desired, the upper ends of the pads may be formed with recesses 38 to increase the flexibility thereof. The arrangement is such that when the ventilator is swung to its closed position, the pads firmly engage the inner surfaces of the hinge parts and the adjacent outer surface of the wall 15 in a manner to effectively seal the openings 36.

What I claim as my invention is:

1. A ventilator comprising a reinforced frame of resilient yieldable material defining a space of predetermined area and having a continuous channel at the inner side for receiving the marginal edges of a closure, a resilient weather sealing lip projecting from the perimeter of the frame and engageable with a fixed surface in the closed position of the ventilator frame, a hinge member secured to one side of the frame and extending for substantially the full length of the latter, a second hinge member projecting from the fixed surface beyond the said one side of the frame and pivotally connected to the first hinge member, and resilient yieldable projections extending from the side aforesaid of the frame adjacent opposite ends of the hinge members and engageable with the latter and fixed surface in the closed position of the ventilator frame to seal the openings at opposite ends of the hinge members.

2. A ventilator comprising a continuous frame of molded resilient yieldable material, a continuous metal frame bonded to the inboard side of the aforesaid frame for reinforcing the latter, a hinge having a part extending along one side of the resilient yieldable frame and positioned in abutting engagement with the outboard surface of the said side thereof, and means for securing the hinge part and the adjacent side of the metal frame together with the side aforesaid therebetween.

3. A ventilator comprising a continuous reinforced frame of molded resilient yieldable material, a hinge part extending along one side of the said frame and clamped thereto, a second hinge part hingedly connected to the first named hinge part, and resilient yieldable projections extending laterally from the side aforesaid of the frame and located to yieldably engage the hinge parts adjacent opposite ends of the latter in the closed position of the rubber-like frame.

4. A ventilator comprising a continuous frame of molded resilient yieldable material, a continuous metal frame bonded to the said frame for reinforcing the latter, a hinge part extending along the top side of the said frame and secured to the adjacent side of the metal frame, a second hinge part hingedly connected to the first-named part, and integral projections on the top side of the resilient yieldable frame adjacent opposite ends of the hinge parts for yieldably engaging said parts in the closed position of the ventilator.

CARL J. WAGNER.

REFERENCES CITED

The following references are of record in the file of this patent:

UNITED STATES PATENTS

| Number | Name | Date |
| --- | --- | --- |
| 1,963,941 | Duffy | June 19, 1934 |
| 2,138,816 | Holt et al. | Dec. 6, 1938 |
| 2,252,505 | Harris | Aug. 12, 1941 |